(12) United States Patent
Dropps et al.

(10) Patent No.: US 7,773,592 B1
(45) Date of Patent: Aug. 10, 2010

(54) METHOD AND SYSTEM FOR ROUTING NETWORK INFORMATION

(75) Inventors: Frank R. Dropps, Maple Grove, MN (US); Leonard W. Haseman, Eagan, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 745 days.

(21) Appl. No.: 11/533,873

(22) Filed: Sep. 21, 2006

(51) Int. Cl.
- *H04L 12/56* (2006.01)
- *H04L 12/50* (2006.01)
- *H04L 1/00* (2006.01)
- *H04L 12/26* (2006.01)
- *H04J 3/00* (2006.01)

(52) U.S. Cl. .................. 370/389; 370/383; 370/395.71; 370/395.72; 370/531; 370/216; 370/229

(58) Field of Classification Search ................ 370/389, 370/229, 230, 230.1, 231, 232, 233, 234, 370/235, 235.1, 236, 236.1, 236.2, 237, 238, 370/238.1, 239, 240, 351, 360, 386, 395.42

See application file for complete search history.

(56) References Cited

U.S. PATENT DOCUMENTS

2005/0018674 A1* 1/2005 Dropps et al. ............... 370/389

\* cited by examiner

*Primary Examiner*—Kwang B Yao
*Assistant Examiner*—Adam Duda
(74) *Attorney, Agent, or Firm*—Klein, O'Neill & Singh, LLP

(57) ABSTRACT

Method and system for routing frames in a network is provided. The method comprises, receiving a frame at a receive port of a networking switch element; determining a transmit port and a virtual lane for routing the frame; asserting a request signal to the transmit port; waiting for an accept signal from the transmit port; determining if an output link on the transmit port is unavailable and if a flow control credit is available for transmitting the frame; sending the frame to the transmit port if the accept signal is asserted; and transmitting the frame on the output link and de-asserting the request signal.

20 Claims, 10 Drawing Sheets

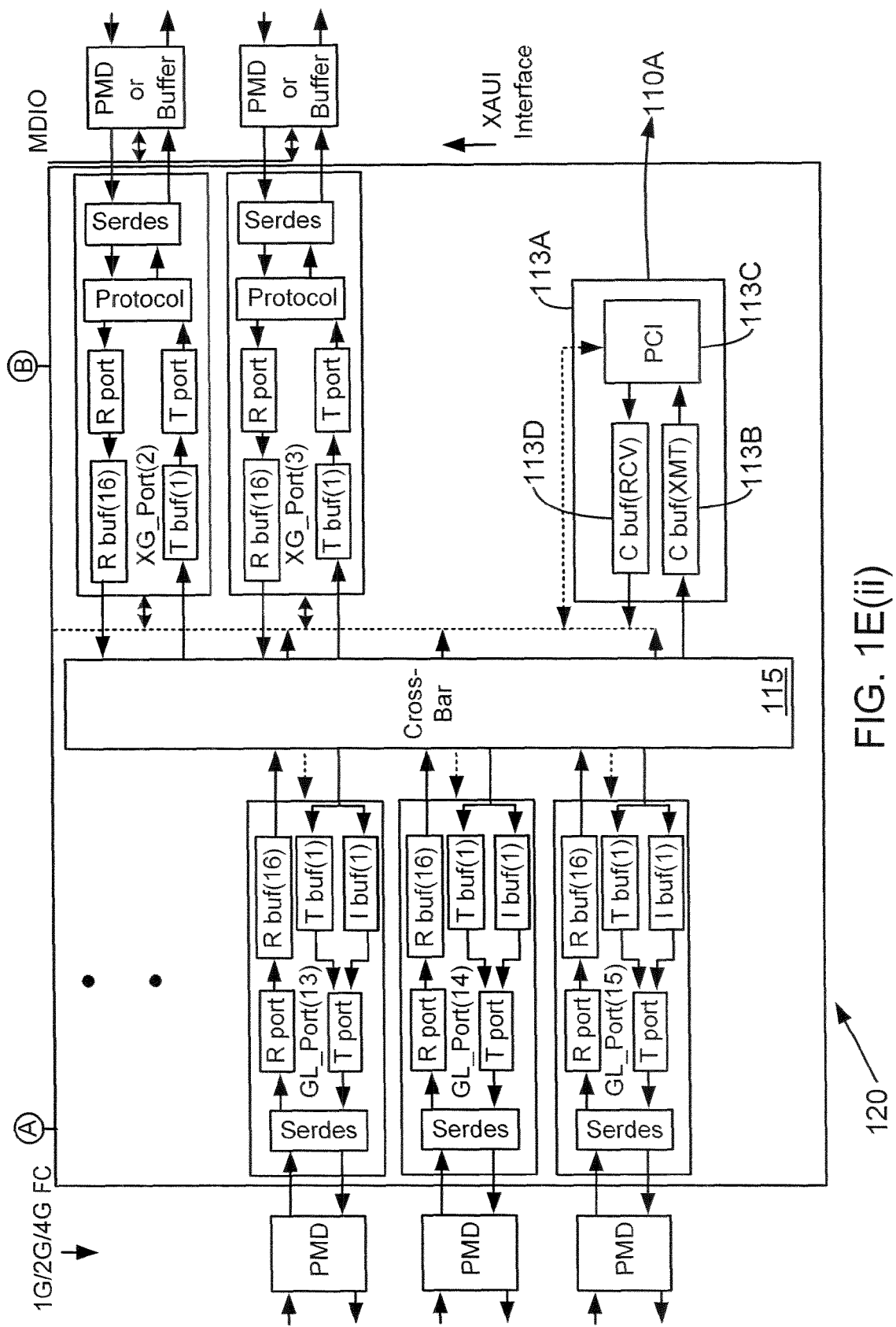
FIG. 1E(ii)

METHOD AND SYSTEM FOR ROUTING NETWORK INFORMATION

BACKGROUND

1. Field of the Invention

The present invention relates to network systems, and more particularly, to routing frames.

2. Background of the Invention

Frames/packets carry network information that is exchanged between network nodes. The network system may be based on standard (or proprietary or a combination thereof) protocols, for example, Fibre Channel, Infiniband or any other standard. Typically, Fibre Channel networks use frames while Infiniband networks use packets.

InfiniBand (IB) is a switched fabric interconnect standard for servers, incorporated herein by reference in its entirety. IB technology is deployed for server clusters/enterprise data centers ranging from two to thousands of nodes. The IB standard is published by the InfiniBand Trade Association, and is incorporated herein by reference in its entirety.

Fibre Channel is a set of American National Standard Institute (ANSI) standards (incorporated herein by reference in their entirety), which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

A Fibre Channel (or IB) switch is typically a multi-port device where each port manages a point-to-point connection between itself and its attached system. Each port can be attached to a server, peripheral, I/O subsystem, bridge, hub, router, or even another switch. A switch receives messages from one port and routes it to another port.

Typically, when a switch receives a frame (for example, a Fibre Channel frame or an IB packet) at a receive port, it parses the frame and sends a tag to a transmit port so that the frame can be sent to its destination. The receive port is attached to a physical link which may be a copper or an optical link. The rates at which the physical link can receive or transmit data, hereafter, referred to as link-rate, vary from link to link. For example, link-rates may vary from 1 gigabits per second (may be referred to as "G") (1 G), 2 G, 4 G, 8 G, 10 G or others.

In a Fibre Channel Fabric, plural Fibre Channel switches are connected via an Inter Switch Link (ISL). If an ISL transfers frames for multiple destinations, then the ISL may slow down to the speed of the slowest destination (or link). For example, a port operating at 4 G can only send a maximum of 1 G if the destination port is operating at 1 G, even though the ISL may be capable of operating at a higher rate, for example, 10 G. This may occur because frames to the 1 G destination arrive faster than they can be delivered, and the receive buffers on the ISL become full.

Multiple virtual lanes have been used to minimize the foregoing situation by dividing traffic on an ISL. Each virtual lane has separate flow control and uses flow control signals, for example, VC_RDY, a Fibre Channel primitive.

Receive buffers on the ISL are typically divided evenly between the virtual lanes. If traffic on one virtual lane slows, then the other virtual lanes can use the remaining bandwidth on the ISL.

Typically, a First-In-First-Out (FIFO) queue is maintained in every transmit port for each receive port. When a frame is received at the receive port it sends a tag to a transmit port. Each tag contains information about the virtual lane and the receive port number. The transmit port stores the tag information in the FIFO queue.

When an output link is available, the transmit port looks at the tag for virtual lane information. If flow control credit is available for the virtual lane, then it informs the receive port to send the frame. If flow control credit is not available for the virtual lane, then all the frames have to wait, even if there is flow control credit for other virtual lanes.

One solution would be to have a queue for every virtual lane from every receive port to every transmit port. But, this would be very expensive in hardware, because it will need more memory and logic. For example, a 16-port switch that supports 4 virtual lanes would need 64 queues for each transmit port i.e. 1024 queues.

The foregoing problem although described with respect to Fibre Channel networks may also occur in IB or other networks.

Therefore, better frame/packet routing techniques and system are needed.

SUMMARY OF THE INVENTION

In one aspect of the present invention, a method for routing frames in a network is provided. The method comprising, receiving a frame at a receive port of a networking switch element; determining a transmit port and a virtual lane for routing the frame; asserting a request signal to the transmit port; waiting for an accept signal from the transmit port; determining if an output link on the transmit port is unavailable and if a flow control credit is available for transmitting the frame; sending the frame to the transmit port if the accept signal is asserted; and transmitting the frame on the output link and de-asserting the request signal.

In another aspect of the present invention, a method for routing frames in a network is provided. The method comprises receiving a frame at a receive port of a networking switch element; determining a transmit port and a virtual lane for routing the frame; asserting a request signal and sending the frame and additional information along with the request signal to the transmit port; transmitting the frame on an output link and de-asserting the request signal, if a flow control credit is available for the frame and the output link is available; and waiting for an accept signal to be set to re-send the frame, if the output link is unavailable.

In yet another aspect of the present invention, a networking switch element for routing frames is provided. The switch element includes a receive port that receives a frame and determines a transmit port and a virtual lane for routing the frame; and asserts a request signal continuously and waits for an accept signal from the transmit port that determines, if an output link is available and if flow control credit is available for transmitting the frame; and transmits the frame on the output link, if available, and de-asserts the request signal.

In another aspect, the receive port asserts a request signal and sends the frame and additional information along the signal to the transmit port that transmits the frame via an available output link and if flow control credit is available for the frame; and if the output link is unavailable then the receive port waits for an accept signal to re-send the frame.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION

To facilitate an understanding of the preferred embodiment, the general architecture and operation of a network system and a switch element will be described. The specific architecture and operation of the preferred embodiment will then be described with reference to the general architecture.

Figure 1A:
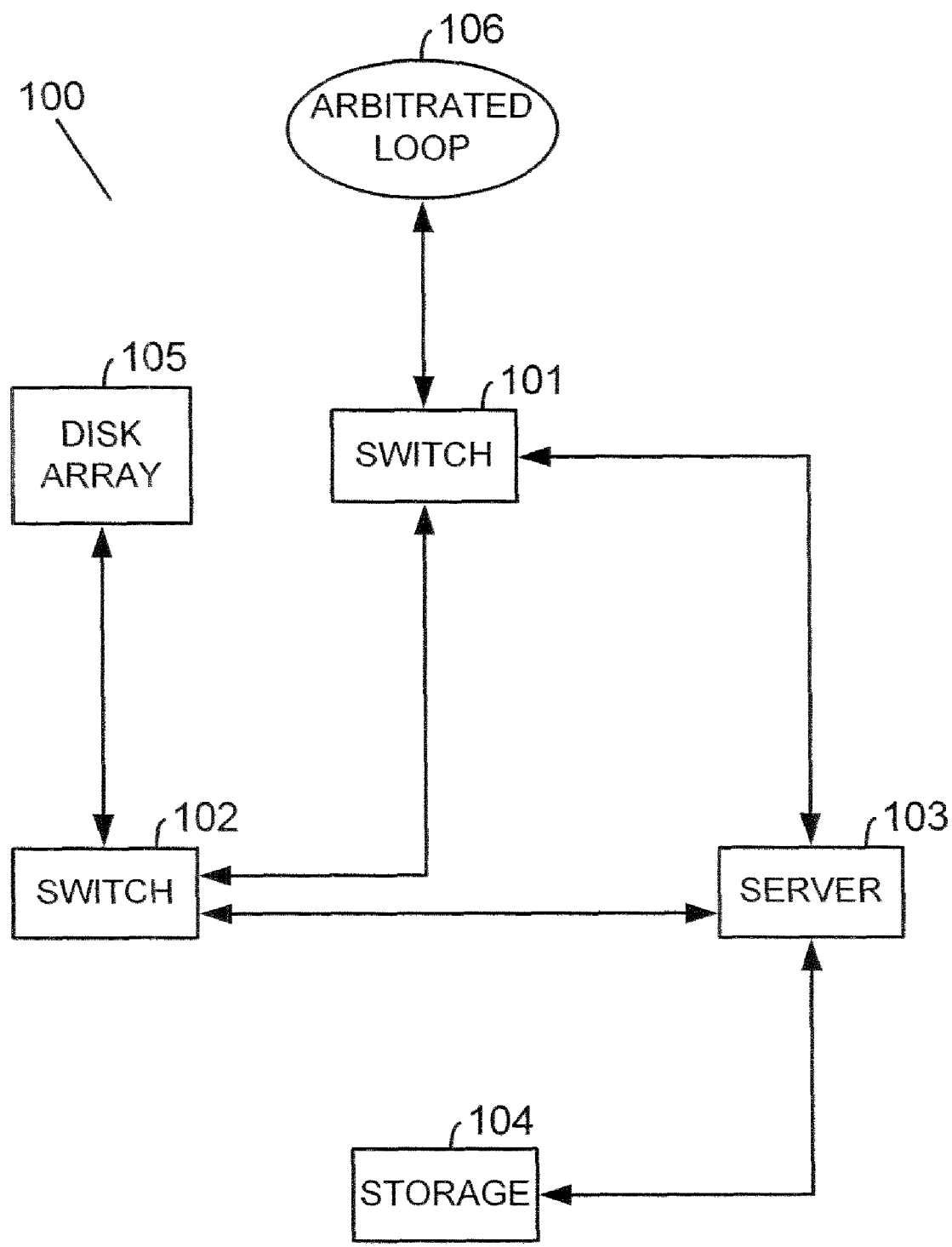
FIG. 1A shows an example of a network system used according to one aspect of the present invention.

Network System:

FIG. 1A is a block diagram of a network system 100 implementing the methods and systems in accordance with the adaptive aspects of the present invention. Network system 100 may be based on Fibre Channel, IB or any other protocol. The examples below are described with respect to Fibre Channel but are applicable to IB and other network standards.

System 100 includes plural devices that are interconnected. Each device includes one or more ports, classified as for example, node ports (N_Ports), fabric ports (F_Ports), and expansion ports (E_Ports). Node ports may be located in a node device, e.g. server 103, disk array 105 and storage device 104. Fabric ports are located in fabric devices such as switch 101 and 102. Arbitrated loop 106 may be operationally coupled to switch 101 using arbitrated loop ports (FL_Forts).

The devices of FIG. 1A are operationally coupled via "links" or "paths". A path may be established between two N_ports, e.g. between server 103 and storage 104. A packet-switched path may be established using multiple links, e.g. an N_Port in server 103 may establish a path with disk array 105 through switch 102.

Figure 1B:
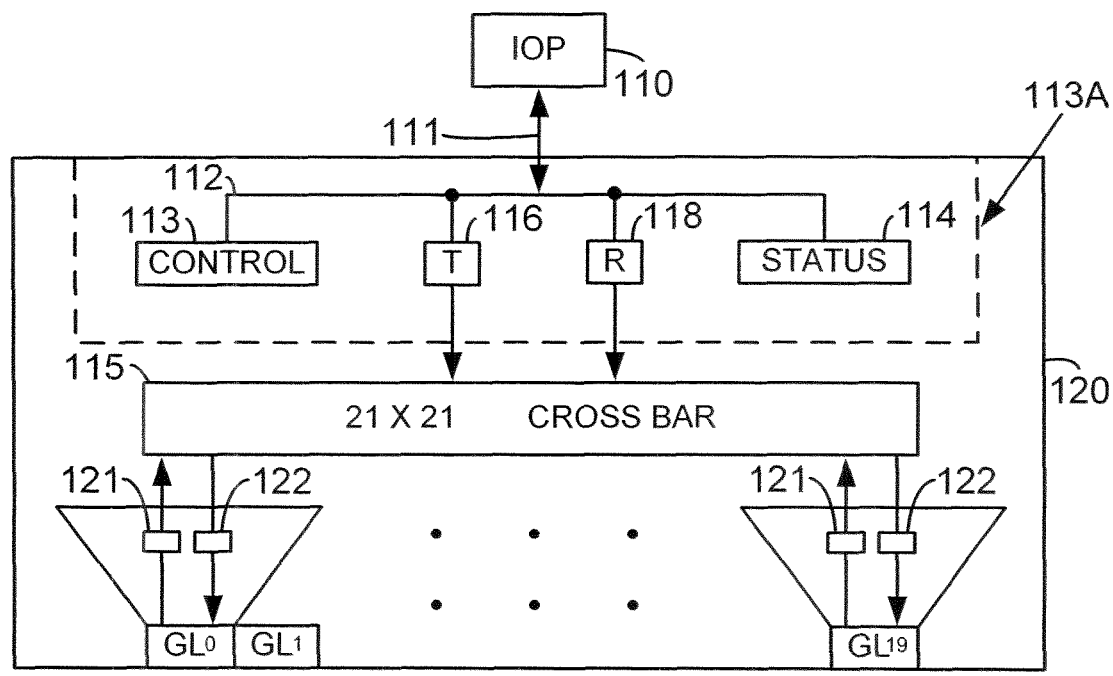
FIG. 1B shows an example of a switch element, according to one aspect of the present invention.

Switch Element:

FIG. 1B is a block diagram of a 20-port ASIC fabric element according to one aspect of the present invention. FIG. 1B provides the general architecture of a 20-channel switch chassis using the 20-port fabric element. Fabric element includes ASIC 120 with non-blocking Fibre Channel class (connectionless, acknowledged) service and class 3 (connectionless, unacknowledged) service between any ports. It is noteworthy that ASIC 120 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 120 has 20 ports numbered in FIG. 1B as CL0 through GL19. These ports are generic to common Fibre Channel port types, for example, F_Port, FL_Port and E-Port. In other words, depending upon what it is attached to, each GL port can function as any type of port. Also, the CL port may function as a special port useful in fabric element linking, as described below.

For illustration purposes only, all GL ports are drawn on the same side of ASIC 120 in FIG. 1B. However, the ports may be located on both sides of ASIC 120 as shown in other figures. This does not imply any difference in port or ASIC design. Actual physical layout of the ports will depend on the physical layout of the ASIC.

Each port GL0-GL19 includes transmit and receive connections to switch crossbar 115. Within each port, one connection is through receive buffer 121, which functions to receive and temporarily hold a frame during a routing operation. The other connection is through transmit buffer 122.

Switch crossbar 115 includes a number of switch crossbars for handling specific types of data and data flow control information. For illustration purposes only, switch crossbar 115 is shown as a single crossbar. Switch crossbar 115 is a connectionless crossbar (packet switch) of known conventional design, sized to connect 21×21 paths. This is to accommodate 20 GL ports plus a port for connection to a fabric controller, which may be external to ASIC 120.

In the preferred embodiments of switch chassis described herein, the fabric controller is a firmware-programmed microprocessor, also referred to as the input/output processor ("IOP"). As seen in FIG. 1B, bi-directional connection to IOP 110 is routed through port 111, which connects internally to a control bus 112. Transmit buffer 116, receive buffer 118, control register 113 and Status register 114 (within block 113A) connect to bus 112. Transmit buffer 116 and receive buffer 118 connect the internal connectionless switch crossbar 115 to IOP 110 so that it can source or sink frames.

Control register 113 receives and holds control information from TOP 110, so that IOP 110 can change characteristics or operating configuration of ASIC 120 by placing certain control words in register 113. IOP 110 can read status of ASIC 120 by monitoring various codes that are placed in status register 114 by monitoring circuits (not shown).

Figure 1C:
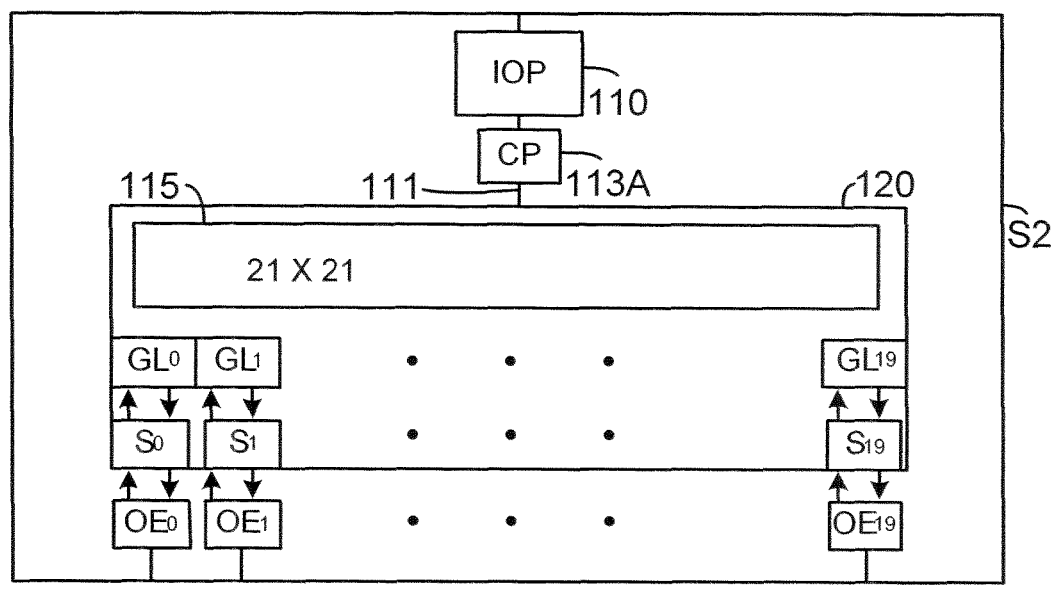
FIG. 1C shows a block diagram of a 20-channel switch chassis, according to one aspect of the present invention.

FIG. 1C shows a 20-channel switch chassis S2 using ASIC 120 and IOP 110. IOP 110 in FIG. 1C is shown as a part of a switch chassis utilizing one or more of ASIC 20. S2 also includes other elements, for example, a power supply (not shown). The 20 GL_Ports correspond to channels C0-C19.

Each GL_Port has a serial/deserializer (SERDES) designated as S0-S19. Ideally, the SERDES functions are implemented on ASIC 120 for efficiency, but may alternatively be external to each GL_Port. The SERDES converts parallel data into a serial data stream for transmission and converts received serial data into parallel data.

Each GL_Port may have an optical-electric converter, designated as OE0-OE19 connected with its SERDES through serial lines, for providing fibre optic input/output connections, as is well known in the high performance switch design. The converters connect to switch channels C0-C19. It is noteworthy that the ports can connect through copper paths or other means instead of optical-electric converters.

Figure 1D:
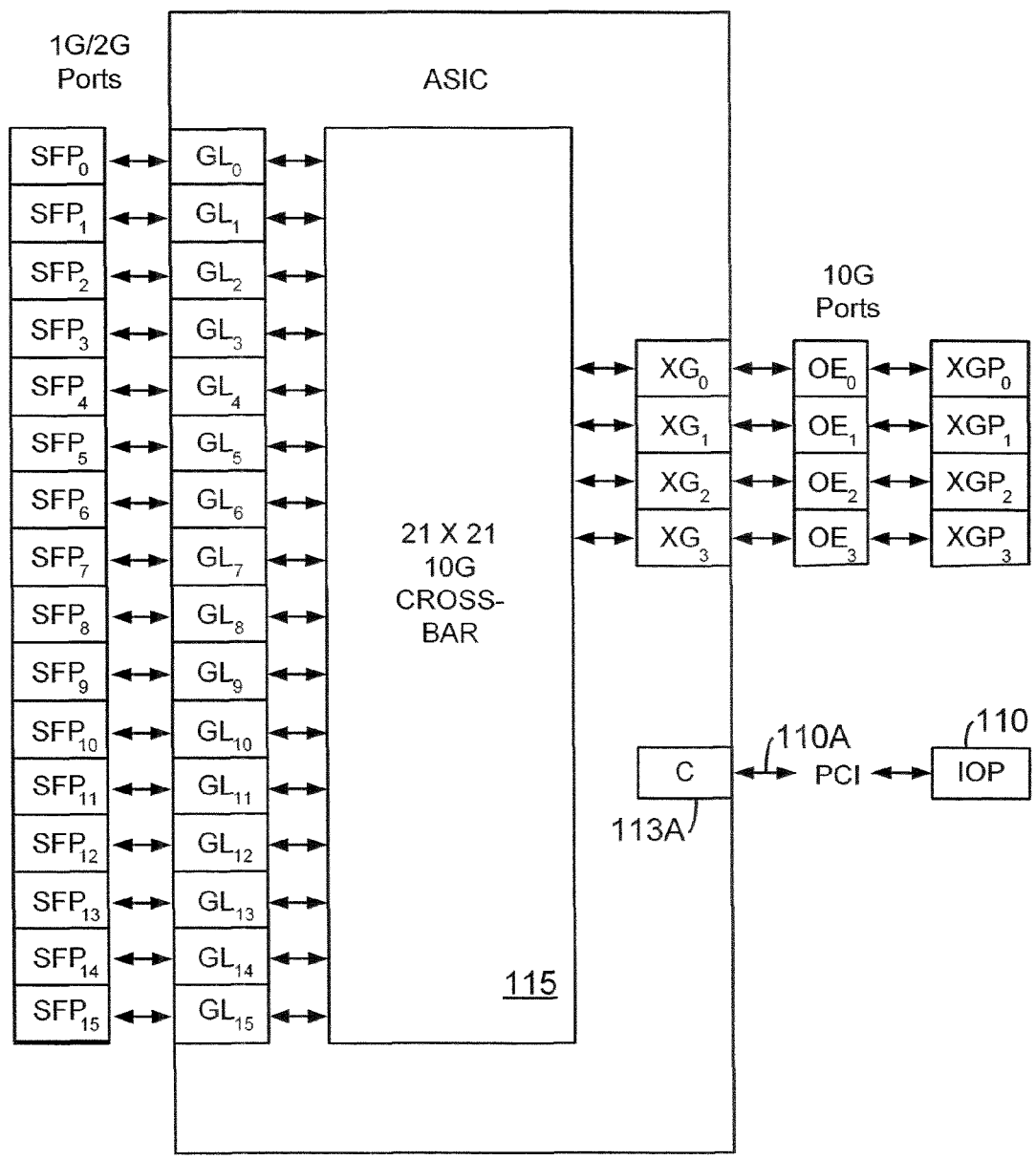
FIG. 1D shows a block diagram of a switch element with sixteen GL_Ports and four 10 G ports, according to one aspect of the present invention.

FIG. 1D shows a block diagram of ASIC 120 with sixteen GL ports and four 10 G (Gigabyte) port control modules designated as XG0-XG3 for four 10 G ports designated as XGP0-XGP3. ASIC 120 include a control port 113A that is coupled to IOP 110 through a PCI connection 110A.

Figure 1E:
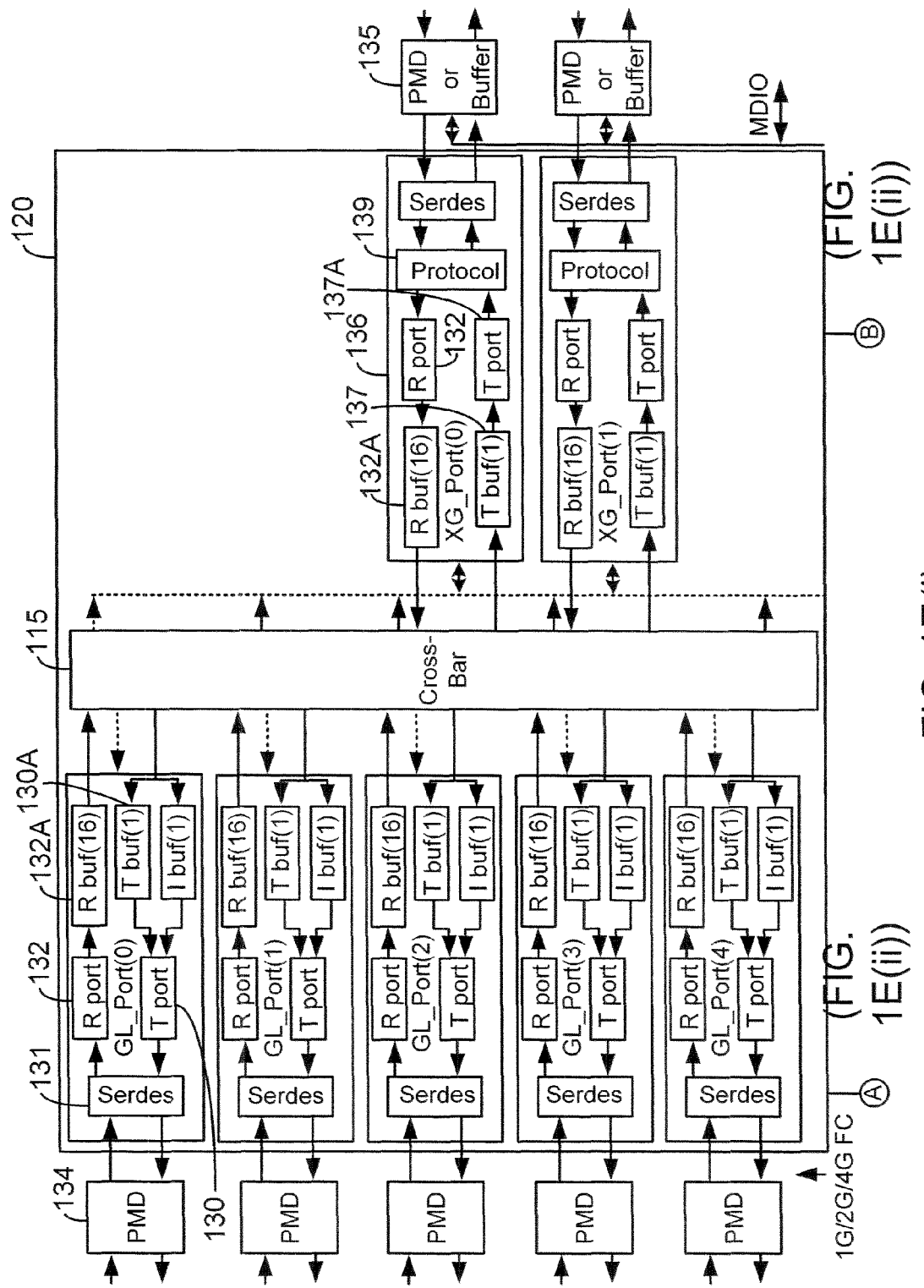
FIG. 1E [1E(i)-1E(ii)] shows a block diagram of a switch element that routes a frame, according to one aspect of the present invention.

FIGS. 1E(i)/1E(ii) (jointly referred to as FIG. 1E) show yet another block diagram of ASIC 120 with sixteen GL and four XG port control modules. Each GL port control module has a Receive port (RPORT) 132 with a receive buffer (RBUF) 132A (similar to 121, FIG. 1B) and a transmit port 130 with a transmit buffer (TBUF) 130A (similar to 122, FIG. 1B). GL and XG port control modules are coupled to physical media devices ("PMD") 134 and 135 respectively.

Control port module 113A includes control buffers 113B and 113D for transmit and receive sides, respectively. Module 113A also includes a PCI interface module 113C that allows interface with IOP 110 via a PCI bus 110A. It is noteworthy that the present invention is not limited the PCI bus standard, any other protocol/standard may be used to interface control port 113A components with IOP 110.

XG_Port (for example 136) includes RPORT 138A with RBUF 138 similar to RPORT 132 and RBUF 132A and a TBUF 137 and TPORT 137A similar to TBUF 130A and TPORT 130. Protocol module 139 interfaces with SERDES to handle protocol based functionality.

Incoming frames are received by RPORT 132 via SERDES 131 and then transmitted using TPORT 130. Buffers 132A and 130A are used to stage frames in the receive and transmit paths.

Figure 1F:
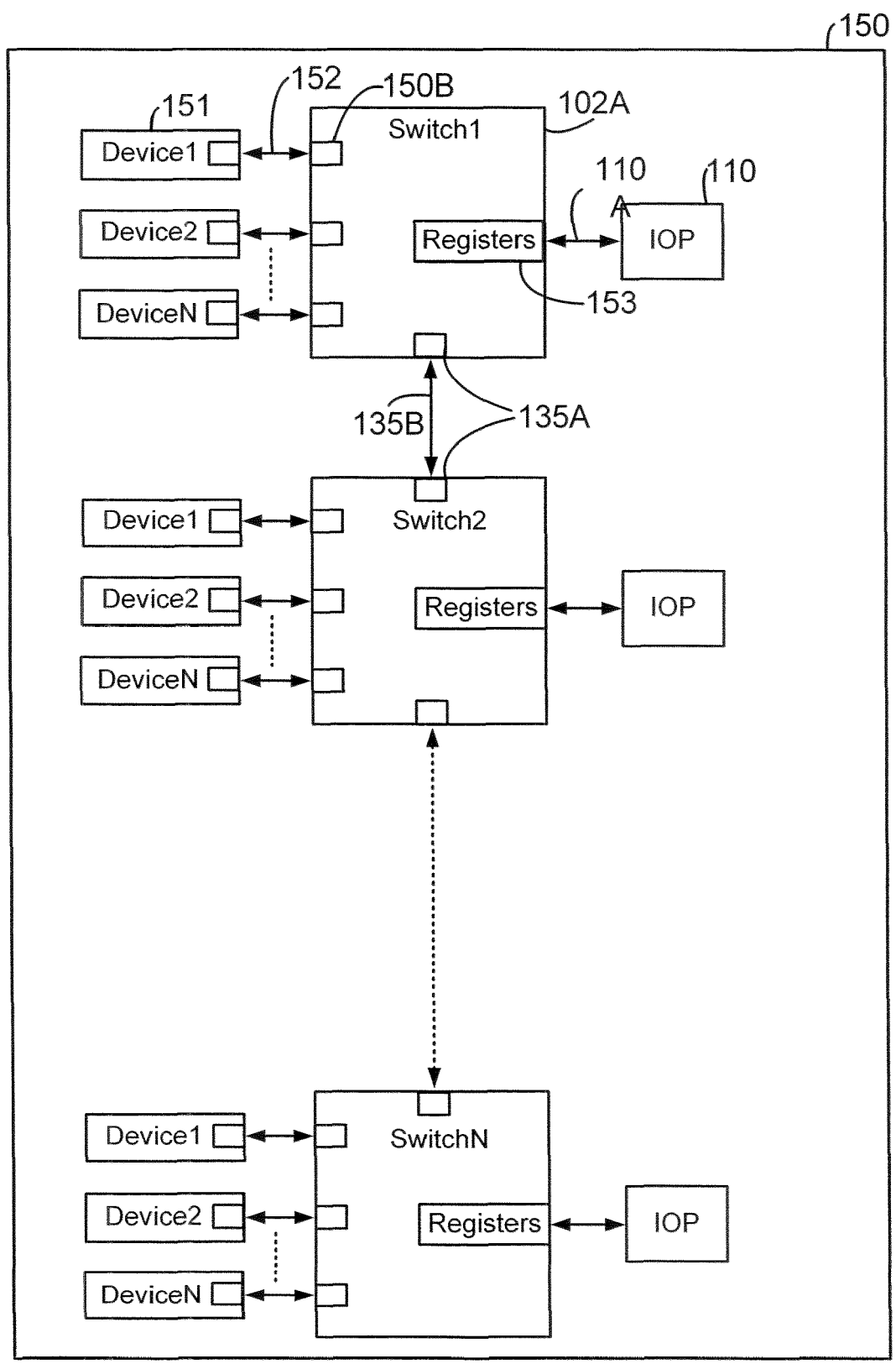
FIG. 1F shows a block diagram of a Fabric used according to one aspect of the present invention.

Fabric:

FIG. 1F shows a block diagram of a network Fabric 150 used according to one aspect of the present invention. Fabric 150 may support a Fibre channel, IB or any standard/proprietary protocol.

Turning in detail to FIG. 1F, plural networking switches (shown as Switch 1 (102A), Switch 2 . . . Switch N) are interconnected through port 135A via a link 135B.

Switch 102A includes multiple input/output ("I/O") ports 150B and is coupled to IOP 110 though bus 110A, for example, a PCI bus. Input/output ports 150B include receive port 132 and transmit port 130, described above with respect to FIGS. 1B-1E.

Plural devices (shown as 151) are connected to I/O ports 150B via physical links 152. Physical link 152 may be copper or optical. The link-rate may vary from 1 G, 2 G, 4 G, 8 G, 10 G or any other rate.

When a receive port example) 132 receives a frame, it determines the output transmit port (for example 130) and maps a virtual lane for the frame. It then passes frame information to switch crossbar 115. According to one aspect of the present invention, receive port 132 uses a signaling mechanism with transmit port 130 to transmit the frame on output link 135B, as described below.

Figure 2A:
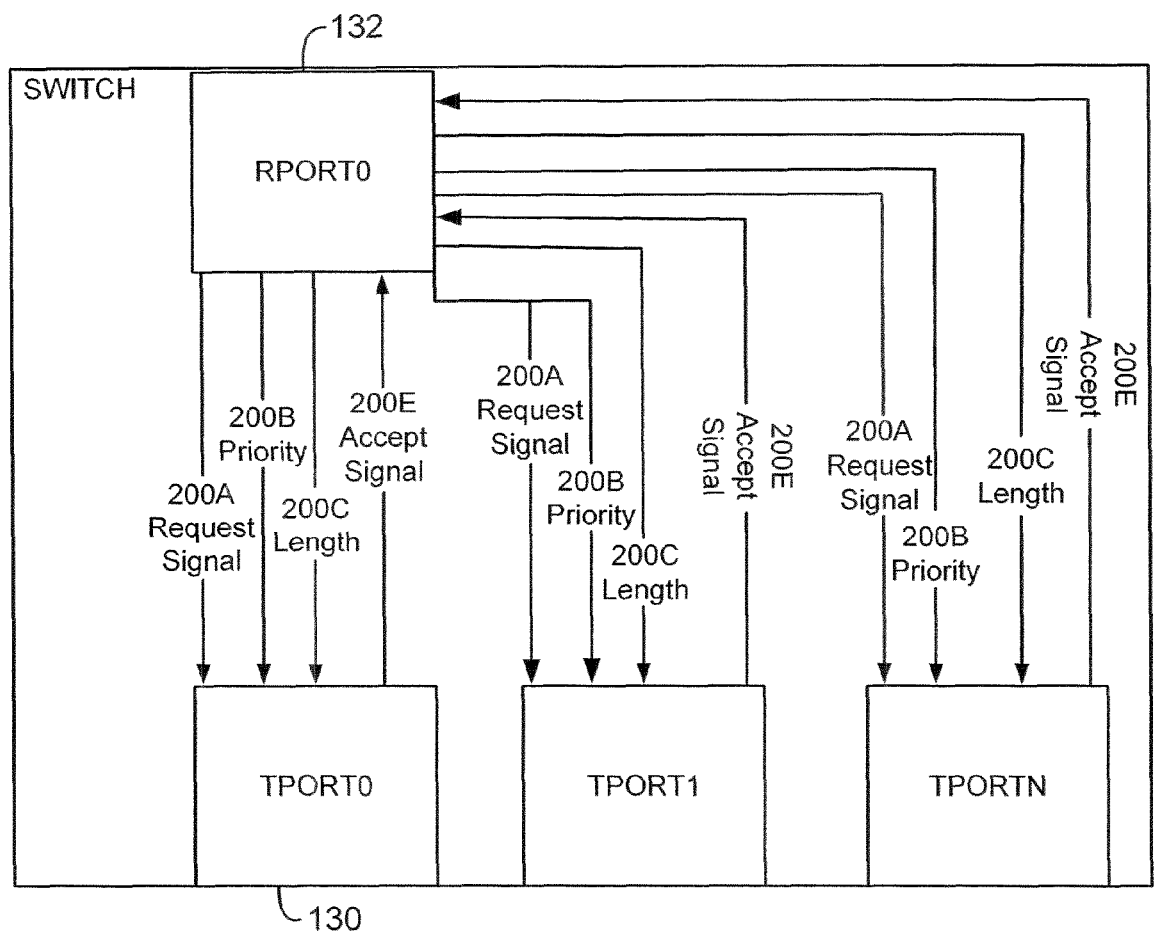
FIG. 2A shows plural signals between a receive port and a transmit port, according to one aspect of the present invention.

Signaling Mechanism:

FIG. 2A shows plural signals between receive port (RPORT 0) 132 and transmit port (s) (TPORT 0, TPORT 1, TPORT 2) 130 in a networking switch, according to one aspect of the present invention. Request signal 200A is used to indicate the presence of a frame at RPORT 132. If virtual lanes are used, then there is a request signal for each virtual lane. If virtual lanes are not implemented, then there could be a single request signal from every receive port (only one RPORT 0 is shown but there may be other RPORTs) to every transmit port. Binary encoding may be used to reduce the number of wires, as illustrated in the example below.

For each receive port (only 1 shown in FIG. 2A), 4 transmit ports and 4 virtual lanes (virtual lane0, virtual lane1, virtual lane2, virtual lane3), 4 request signals may be sent from each receive port to each transmit port. The request signals (200A) may alternately be binary encoded with 2 bits to reduce the number of wires originating from the receive port the transmit port. If bit0 and bit1 are used as signal bits and if both bits are asserted simultaneously, then it may indicate that the request signal is asserted for virtual lane3. Similarly, if bit0 is asserted and bit1 is not, then it could indicate that the request signal is asserted for virtual lane0. The signaling process is further explained below with respect to FIG. 3.

Priority signal 200B may also be sent along with request signal 200A to the transmit ports 130. Signal 200B is used to determine a winner in case of arbitration that is described below with respect to FIG. 2B.

Length 200C may also sent along with the request signal in case of an Infiniband switch element. Length 200C may be more than 1 bit wide. To reduce the number of wires, length 200C may be time domain multiplexed. For example, if length 200C is encoded in 9 bits, and if it is 3 bits wide, then it may take 3 time slices to send length 200C information to a transmit port.

Multiple receive port signals may be time domain multiplexed over length signal 200C. The packet length value for each virtual lane may be time domain multiplexed over length signal 200C. Length data to multiple transmit ports may also be time domain multiplexed over length signal 200O.

Accept signal 200E is sent from a transmit port to a receive port so that the receive port may transmit the frame/packet to the transmit port. Similar to request signal 200A, there is an accept signal 200E for each virtual lane. Similar to request signal, accept signal 200E may also be binary encoded to reduce the number of wires and inter-connections between receive and transmit ports.

Figure 2B:
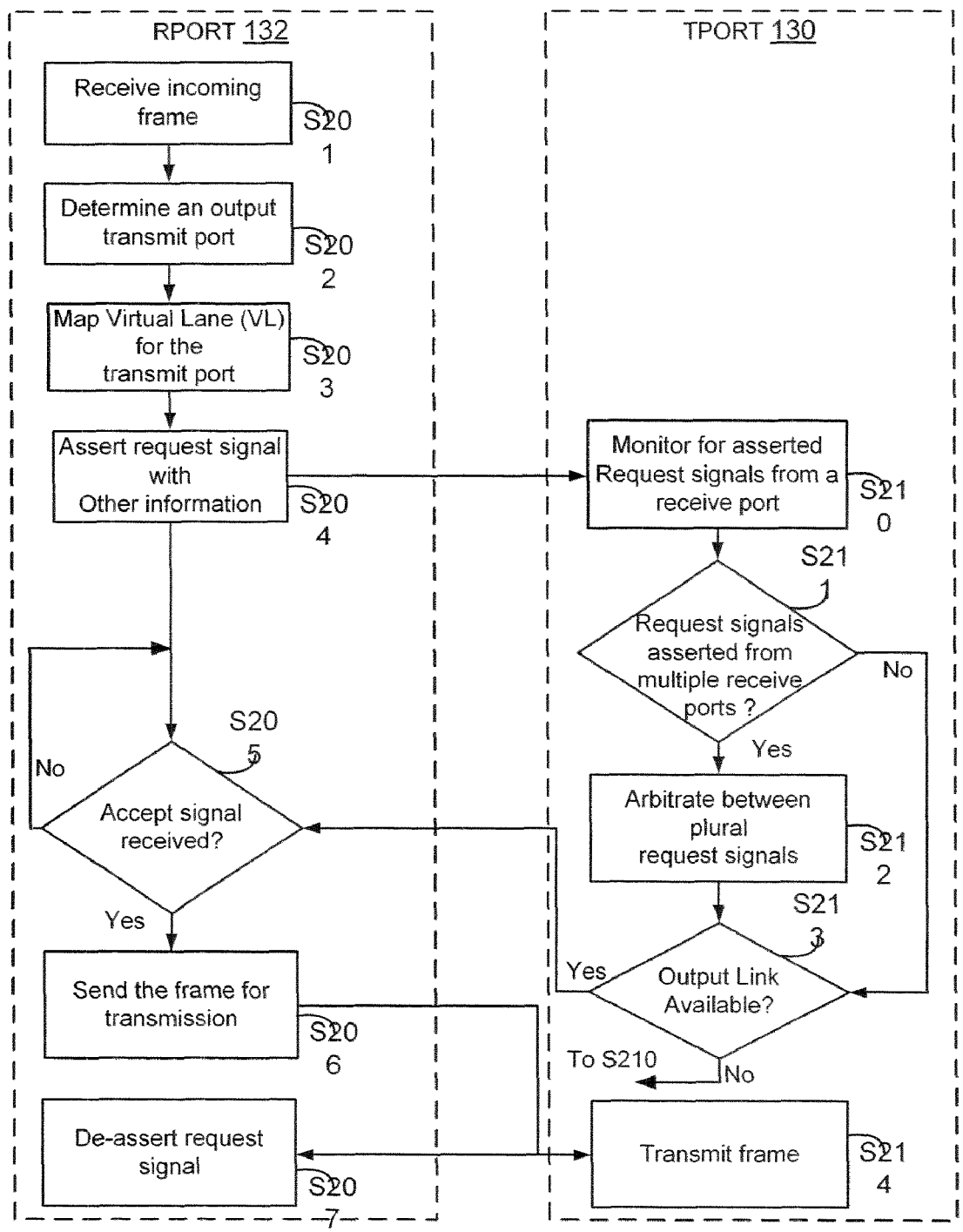
FIG. 2B shows a top-level flow diagram for routing frames using a signaling method, according to one aspect of the present invention.

Process Flow for Routing Frames:

FIG. 2B shows a flow chart for routing frames, according to one aspect of the present invention. The flow chart shows process steps that are executed in RPORT 132 and TPORT 130.

Turning in detail to FIG. 2B, in step S201, receive port 132 receives a frame.

In step S202, receive port 132 parses the incoming frame by looking at the frame header and determines an output transmit port 130.

in step S203, if virtual lanes are being used, receive port 132 maps a virtual lane for the frame. If there are multiple virtual lanes that the frame can be transmitted on, the receive port chooses a virtual lane depending on the destination port. It is noteworthy that the receive port may use several factors to determine the virtual lane for the frame, for example, a frame destination identifier or address, frame source identifier or address, packet service level, frame priority and link-rate.

In step S204, receive port 132 asserts request signal 200A to transmit port 130. Request signal 200A indicates the presence of a frame that is waiting to be transmitted. Receive port 132 may also provide transmit port 130 with additional information for example, Priority 200B, frame aging and frame length 200C. Transmit port 130 uses the additional information to determine a winner in case of arbitration, as described below. It is noteworthy that the additional information may be stored in registers 153 that may be accessible to both receive and transmit ports.

In step S205, receive port 132 waits for an accept signal 304 from transmit port 130.

In step S210, transmit port 130 continuously checks for any asserted request signals from receive ports.

In step S211, transmit port 130 determines if multiple request signals are asserted simultaneously from plural receive ports.

If there is only one request signal (200A) asserted in step S211, then in step S213, transmit port 130 checks if physical link 135B is available. If physical link 135B is available and flow control credit is available, then transmit port 130 asserts an accept signal for the virtual lane to receive port 132.

If an accept signal is asserted for the virtual lane, then in step S206, receive port 132 sends the frame to transmit port 130.

In step S214, transmit port 130 transmits the frame. Thereafter, in step S207, transmit port 130 de-asserts the request signal.

In step S211, if more than one request signal is asserted simultaneously from multiple receive ports, then in step S212, transmit port 130 performs arbitration to determine a winner. Transmit port 130 uses the additional information (Priority 200B, Frame length 200C) sent by the receive ports to perform the arbitration.

In one aspect, transmit port 130 may determine a winner using a multi-level priority algorithm. Different frames may have different priorities, for example, a frame may be assigned priorities P0, P1, P2, P3, where P3 has higher priority than P0. The frame with the highest priority wins arbitration.

Transmit port 130 may also determine a winner using frame aging. Frame age is defined as the elapsed time between frame arrival at a receive port and the assertion of a request signal to a transmit port to move that frame. If multiple request signals with different frame ages are asserted simultaneously, then oldest age wins arbitration.

In another aspect, for example, in an Infiniband network, frame length 200C may be used to determine arbitration winner in addition to priority 200B and frame aging or other factors.

It is noteworthy that transmit port 130 can use a combination of virtual lane, availability of flow control credit, frame length 200C, frame priority 200B and frame aging, round-robin scheme or other factors to determine an arbitration winner. For example, if multiple request signals with the same priority are asserted simultaneously, then the transmit port could use frame length 200C or frame aging or a combination of both to determine a winner.

Packet length 200C may be used to weight next packet selection or may be compared with available flow control credit to qualify frames/packets for selection by a transmit port.

After arbitration in step S212 the process moves to step S213 as described above.

Process steps S202 through S207 may be active simultaneously in a given receive port (RPORT 132) for frames/packets stored in receive buffers or for multicast frames/packets.

Figure 3:
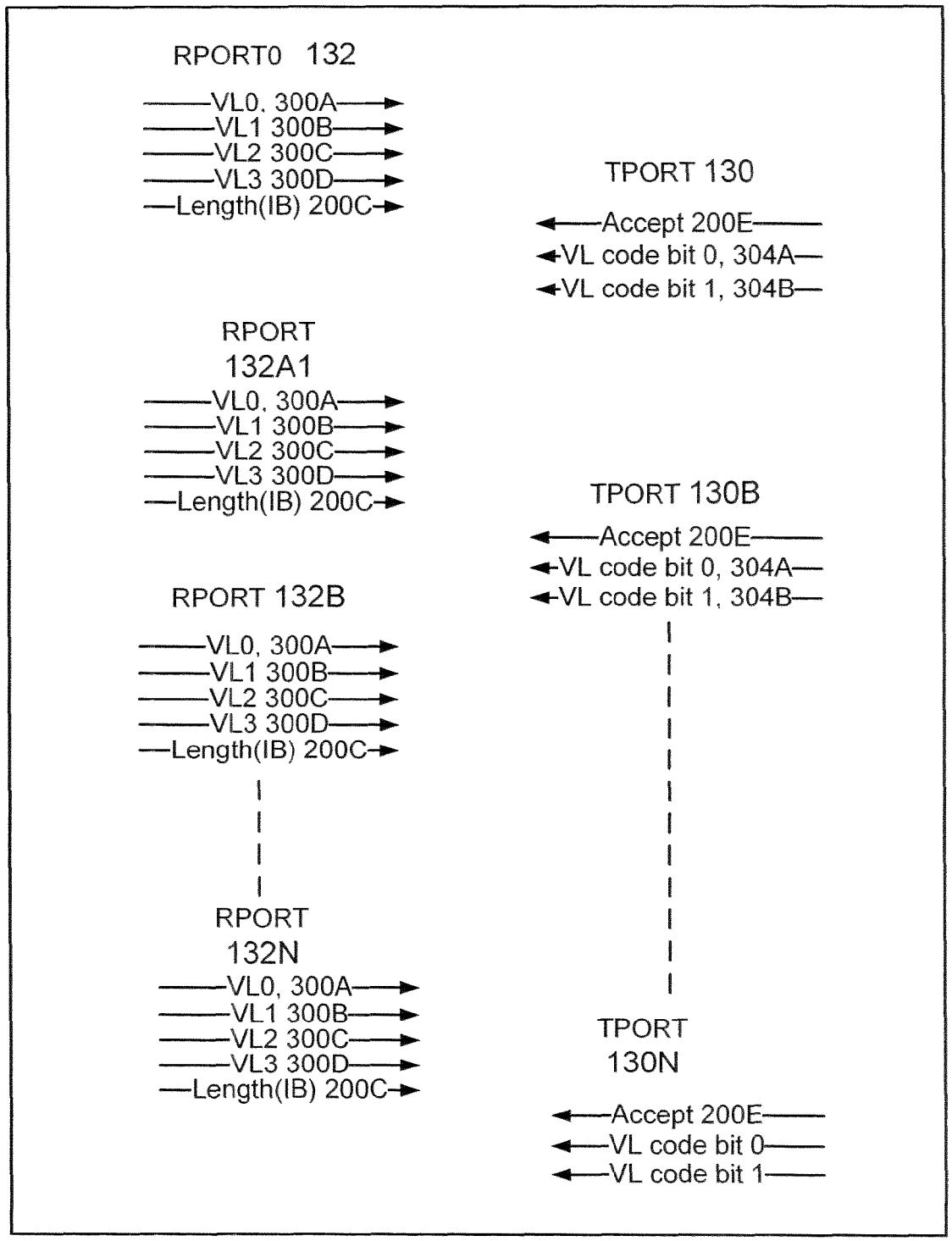
FIG. 3 is an example illustrating a signaling method for routing frames, according to one aspect of the present invention.

FIG. 3 shows an example of the foregoing signaling method, according to one aspect of the present invention. Plural receive ports (132, 132A1, 132B and 132N) and transmit ports (130, 130B, 130N) are shown to move frames. In this example, 4 virtual lanes VL0 300A, VL1 300B, VL2 300C and VL3 300D are used to move frames. In case of an Infiniband network, frame length 200C is also sent to the transmit port (e.g. 130).

Transmit port 130 uses accept signal 200E to inform receive port 132 that the port is ready to transmit the frame. Virtual lane code bit0 (304A) and VL code bit1 (304B) are used to indicate which virtual lane is accepted.

In this example, receive ports 132A1 and 132B each receives two frames destined for transmit port 130B. Receive port 132A1, assigns Virtual lanes VL0 (300A) and (300). Receive port 132B assigns virtual lanes VL1 (300B) and VL3 (300D). Both receive ports 132A1 and 132B assert signals 200A to transmit port 130B.

Transmit port 130B selects one of the signals for a virtual lane for which it has flow control credit. If TPORT 130B selects receive port 132A1 for VL2 (300C), then it activates an accept signal for receive port 132A1. TPORT 130B sets VL code bit0 (304A) to 0, and VL code bit1 (304B) to 1. This allows receive port 132A1 to send frame data over crossbar 115. Once data has been moved, transmit port 130A clears the request signal 300C for that frame.

This signaling process for transmit port 130B serves the same purpose as having individual queues for every virtual lane from every receive port. For example on a 16-port switch using 4 virtual lanes, each transmit port has the equivalent of 64 queues (16 receive ports times 4 virtual lanes).

According to one aspect of the present invention, the signaling mechanism ensures that frames can continue to move even if only 1 virtual lane has flow control credit. Hence, a high speed link can maximize bandwidth use.

Figure 4:
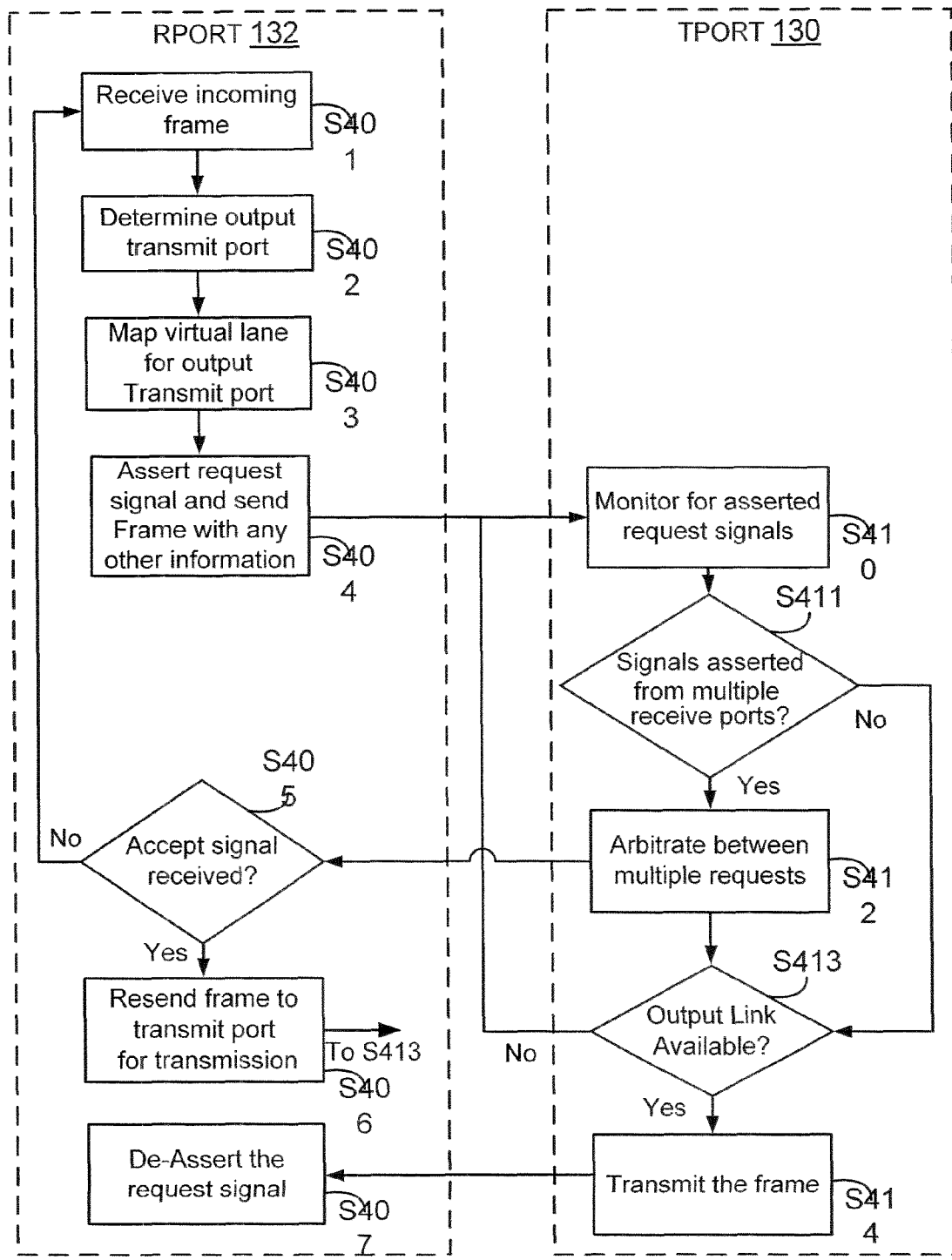
FIG. 4 shows a top-level flow diagram for routing frames using a push-pull method in a networking system, according to one aspect of the present invention.

Routing Frames Using Push-Pull Methodology:

FIG. 4 shows a top-level flow chart for routing frames using a push-pull process, according to one aspect of the present invention. This methodology transmits a frame with minimal latency, when an output link is available.

Turning in detail to FIG. 4, in step S401, receive port 132 receives a frame (or packet, if the network is IB based).

In step S402, receive port 132 parses incoming frame by looking at the frame header and determines an output transmit port.

In step S403, receive port 132 maps a virtual lane for the frame depending on the destination port. It is noteworthy that receive port 132 uses several factors to determine the virtual lane for the frame like the destination port, frame length 200C, frame age and link-rate.

In step S404, receive port 132 asserts a request signal 200A transmit port 130 indicating the presence of a frame that is waiting to be transmitted. Receive port 132 may also send the frame along with request signal 200A without waiting for accept signal 200E from receive port 130. This allows the frame to be transmitted on output link 135B if available (Step S413 and S414). This reduces latency since the handshake process between receive port 130 and transmit port 132 is reduced.

If an output link is unavailable in step S413, then receive port 132 waits in step S405 and re-sends the frame in step S406.

Process steps S410, S411, S412 are similar to process steps S210, S211 and S212 described above with respect to FIG. 2B. Steps S413, S414 and S407 are similar to steps S213, S214 and S207 of FIG. 2B and also described above.

Steps S402 through S407 may be active for a given RPORT 132 simultaneously for frames/packets stored in receive buffers or for multicast frames/packets.

Although the present invention has been described with reference to specific embodiments, these embodiments are illustrative only and not limiting. Many other applications and embodiments of the present invention will be apparent in light of this disclosure and the following claims.

What is claimed is:

1. A machine implemented method for routing frames in a network, comprising:
   (a) receiving a frame at a receive port of a networking switch element;
   (b) determining a transmit port and a virtual lane for routing the frame;
   (c) asserting a request signal to the transmit port and providing additional information to the transmit port regarding the virtual lane, a frame priority and a frame age for the received frame;
   (d) arbitrating between a plurality of request signals that are pending when the request signal is asserted in step (c); wherein the arbitration step uses some or all of the additional information to arbitrate between the plurality of request signals;
   (e) based on the arbitration in step (d), selecting a request signal from the plurality of request signals;
   (f) waiting for an accept signal from the transmit port; wherein the receive port waits for the accept signal;
   (g) determining if an output link on the transmit port is available and if a flow control credit is available for transmitting the frame;
   (h) asserting the accept signal, based on the determination in step (g) and sending the frame to the transmit port after the accept signal is asserted; and
   (i) transmitting the frame on the output link and de-asserting the request signal.

2. The method of claim 1, wherein the receive port asserts a different request signal for each virtual lane.

3. The method of claim 1, wherein the additional information includes a frame length for the received frame.

4. The method of claim 3, wherein the arbitration is based on one or more of an age for the request signal, the virtual lane, the frame priority, the frame age and frame length.

5. The method of claim 1, wherein the transmit port arbitrates between request signals asserted simultaneously by multiple receive ports; request signals asserted simultaneously by multiple receive ports for a virtual lane; multiple virtual lane request signals asserted simultaneously by same receive port; and multiple virtual lane request signals asserted simultaneously by multiple receive ports that have flow control credit.

6. The method of claim 1, wherein the frame is a Fibre Channel frame, Infiniband packet or any other network packet.

7. A machine implemented method for routing frames in a network, comprising:
   (a) receiving a frame at a receive port of a networking switch element;
   (b) determining a transmit port and a virtual lane for routing the frame;
   (c) asserting a request signal and sending the frame and additional information along with the request signal to the transmit port; wherein the additional information includes information regarding the virtual lane, a frame priority and a frame age for the received frame;
   (d) determining if another request signal is pending from another receive port;
   (e) if another request signal is not pending then transmitting the frame on an output link and de-asserting the request signal, if a flow control credit is available for the frame and the output link is available; and waiting for an accept signal to be set to re-send the frame, if the output link is unavailable;
   (f) if another request signal is pending, then arbitrating between the other request signal and the request signal from step (c); wherein the arbitration step uses some or all of the additional information to arbitrate between the request signals;
   (g) based on the arbitration in step (f), selecting a request signal from the plurality of request signals;
   (i) determining if the output link on the transmit port is available and if a flow control credit is available for transmitting the frame; and
   (h) if the output link on the transmit port and the flow control credit are available, then transmitting the frame on the output link and de-asserting the request signal.

8. The method of claim 7, wherein the receive port asserts a different request signal for each virtual lane.

9. The method of claim 7, wherein the additional information includes a frame length for the received frame.

10. The method of claim 9, wherein the arbitration is based on one or more of an age for the request signal, the virtual lane, the frame priority, the frame age and frame length.

11. The method of claim 7, wherein the transmit port arbitrates between request signals asserted simultaneously by multiple receive ports; request signals asserted simultaneously by multiple receive ports for a virtual lane; multiple virtual lane request signals asserted simultaneously by same receive port; and multiple virtual lane request signals asserted simultaneously by multiple receive ports that have flow control credit.

12. The method of claim 7, wherein the frame is a Fibre Channel frame, Infiniband or any other network packet.

13. A networking switch element for routing frames, comprising:
   a receive port that (i) receives a frame and determines a transmit port and a virtual lane for routing the frame; (ii) asserts a request signal and provides additional information to the transmit port regarding the virtual lane, a frame priority and a frame age of the received frame; and (iii) waits for an accept signal from the transmit port;
   wherein the transmit port (a) determines if another request signal from another receive port is pending; (b) if another request is pending, arbitrates between the request signals using some or all of the additional information; (c) selects one of the request signals based on the arbitration; (d) determines if an output link is available and if flow control credit is available for transmitting the frame; (e) transmits the frame on the output link, if available, and (f) de-asserts the request signal.

14. The switch element of claim 13, wherein the receive port asserts a different request signal for each virtual lane.

15. The switch element of claim 13, wherein the additional information includes a frame length for the received frame.

16. The switch element of claim 15, wherein the arbitration is based on one or more of an age for the request signal, the virtual lane, the frame priority, the frame age and frame length.

17. The switch element of claim 13, wherein the transmit port arbitrates between request signals asserted simultaneously by multiple receive ports; request signals asserted simultaneously by multiple receive ports for a virtual lane; multiple virtual lane request signals asserted simultaneously by same receive port; and multiple virtual lane request signals asserted simultaneously by multiple receive ports that have flow control credit.

18. The switch element of claim 13, wherein the frame is a Fibre Channel frame, Infiniband or any other network packet.

19. The switch element of claim 13, wherein the receive port asserts the request signal for frames queued in a receive buffer memory and sends the oldest frame in the receive buffer to the transmit port, or sends the oldest frame in the receive buffer to the transmit port for an accepted virtual lane.

20. The switch element of claim 13, wherein the receive port asserts the request signal and also sends the frame and the additional information along the request signal to the transmit port that transmits the frame via an available output link and if flow control credit is available for the frame; and if the output link is unavailable then the receive port waits for an accept signal to re-send the frame.

* * * * *

UNITED STATES PATENT AND TRADEMARK OFFICE
CERTIFICATE OF CORRECTION

| | | |
|---|---|---|
| PATENT NO. | : 7,773,592 B1 | |
| APPLICATION NO. | : 11/533873 | |
| DATED | : August 10, 2010 | |
| INVENTOR(S) | : Frank R. Dropps et al. | |

It is certified that error appears in the above-identified patent and that said Letters Patent is hereby corrected as shown below:

In column 4, line 21, delete "CL0" insert -- GL0 --, therefor.

In column 4, line 25, delete "CL" and insert -- GL --, therefor.

In column 6, line 40, delete "2000." and insert -- 200C. --, therefor.

In column 6, line 59, delete "in" and insert -- In --, therefor.

In column 7, line 48, after "then" insert -- the request signal that has the --.

In column 8, line 19, delete "(300)." and insert -- VL2 (300C). --, therefor.

In column 8, line 56, after "200A" insert -- to --.

Signed and Sealed this
Twenty-eighth Day of December, 2010

David J. Kappos
*Director of the United States Patent and Trademark Office*